United States Patent
Pushkolli et al.

(10) Patent No.: US 8,829,709 B2
(45) Date of Patent: Sep. 9, 2014

(54) METHOD FOR OPERATING AN ELECTRICAL NETWORK, IN PARTICULAR OF A MOTOR VEHICLE

(75) Inventors: Beqir Pushkolli, Ludwigsburg (DE); Stefan Blind, Fellbach (DE); Daniel Raichle, Eberdingen-Nussdorf (DE); Gunther Goetting, Stuttgart (DE); Manfred Stahl, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 1108 days.

(21) Appl. No.: 12/810,278

(22) PCT Filed: Nov. 26, 2008

(86) PCT No.: PCT/EP2008/066190
§ 371 (c)(1),
(2), (4) Date: Jan. 5, 2012

(87) PCT Pub. No.: WO2009/083342
PCT Pub. Date: Jul. 9, 2009

(65) Prior Publication Data
US 2012/0104845 A1    May 3, 2012

(30) Foreign Application Priority Data

Dec. 27, 2007  (DE) .......................... 10 2007 062 795
Nov. 20, 2008  (DE) .......................... 10 2008 043 943

(51) Int. Cl.
*B60L 1/00* (2006.01)
*B60L 3/00* (2006.01)
*H02G 3/00* (2006.01)

(52) U.S. Cl.
CPC ...................................... *B60L 1/00* (2013.01)
USPC ...................... 307/10.1; 307/101; 180/65.265

(58) Field of Classification Search
CPC ......................................................... H06L 1/00
USPC ......................................................... 307/10.1
See application file for complete search history.

(56) References Cited

U.S. PATENT DOCUMENTS

| 6,109,237 A * | 8/2000 | Pels et al. .................. 123/339.19 |
| 6,940,197 B2 * | 9/2005 | Fujita et al. ............... 310/156.43 |
| 2001/0040437 A1 | 11/2001 | Wakashiro et al. |
| 2004/0008530 A1 * | 1/2004 | Kitahata et al. ................ 363/131 |

(Continued)

FOREIGN PATENT DOCUMENTS

| DE | 100 41 788 | 4/2001 |
| EP | 1 157 873 | 11/2001 |

(Continued)

*Primary Examiner* — Rexford Barnie
*Assistant Examiner* — Toan Vu
(74) *Attorney, Agent, or Firm* — Kenyon & Kenyon LLP

(57) ABSTRACT

A method for operating an electrical network, in particular of a hybrid motor vehicle, the network having at least one electrical accumulator, in particular a high-voltage accumulator, at least one electric machine, and at least one inverter controlling the electric machine, the electrical accumulator being electrically disconnected from the network when a malfunction is detected and the inverter being switched to a short-circuit operating mode when a specifiable voltage limit of a network voltage of the network is subsequently exceeded. There is a provision for switching power semiconductors of the inverter in such a way that the driven electric machine induces a voltage and provides it via free-wheeling diodes on the electrical network and the induced voltage is used for operating the electric machine as a generator such that a specifiable network voltage is set by the electric machine.

18 Claims, 3 Drawing Sheets

(56) References Cited

U.S. PATENT DOCUMENTS

| | | | |
|---|---|---|---|
| 2006/0052915 A1* | 3/2006 | Sato | 701/22 |
| 2006/0103239 A1* | 5/2006 | Kishibata et al. | 307/10.1 |
| 2007/0163821 A1* | 7/2007 | Ogata | 180/65.2 |
| 2008/0092258 A1* | 4/2008 | Clarke et al. | 903/907 |
| 2009/0088291 A1* | 4/2009 | Kumazaki et al. | 477/35 |
| 2009/0112395 A1* | 4/2009 | Prokhorov | 701/33 |

FOREIGN PATENT DOCUMENTS

| | | |
|---|---|---|
| JP | 8-340601 | 12/1996 |
| JP | 09 046812 | 2/1997 |
| JP | 10-100648 | 4/1998 |
| JP | 2005 033901 | 2/2005 |
| JP | 2006-63819 | 3/2006 |
| JP | 2007 318968 | 12/2007 |

* cited by examiner

METHOD FOR OPERATING AN ELECTRICAL NETWORK, IN PARTICULAR OF A MOTOR VEHICLE

FIELD OF THE INVENTION

The present invention relates to a method for operating an electrical network, in particular of a motor vehicle, the network having at least one electrical accumulator, at least one electric machine, and at least one inverter controlling the electric machine, the electrical accumulator being electrically disconnected from the network when a malfunction is detected, and the inverter being switched to a short-circuit operating mode when a specifiable voltage limit of a network voltage of the network is subsequently exceeded.

BACKGROUND INFORMATION

There are believed to be methods for operating an electrical network in a motor vehicle. Especially in the ever more popular hybrid drive devices of motor vehicle, which have at least one electric machine and one internal combustion engine as drive units, a multitude of methods for operating the associated electrical networks are believed to be available. In this connection it is important to set the network voltage of the network so as to provide a sufficient network voltage to all of the loads electrically connected to the network. Since comparatively high voltages must be provided in hybrid motor vehicles in order to be able to use the electric machine as a motor to drive the motor vehicle, methods are known for protecting the electrical network and the components electrically connected to the electrical network, which prevent damage. Thus the inverter controlling the electric machine has an overvoltage protection for example, which switches the inverter into a short-circuit operating mode when a specifiable voltage limit of a network voltage is exceeded, that is, when the network voltage exceeds a specifiable voltage limit.

In addition, it is believed to be understood to disconnect the electrical accumulator electrically from the network when a malfunction, for example of the electrical accumulator, is detected. If the electric machine is operating as a generator at this time, this has the consequence that, by "discarding" the electrical accumulator, the network voltage increases greatly and thus exceeds the specifiable limit voltage of the inverter, whereupon the inverter is switched to the short-circuit operating mode. Since now neither the electrical accumulator nor the electric machine feed power into the network or provide a voltage, the voltage existing in the network, for example of an intermediate circuit capacitor, is quickly reduced until the electrical network breaks down electrically and no network voltage or no usable network voltage remains. If high-voltage loads are connected to the network and are activated, the network accordingly breaks down more quickly. Since now there exists no more network voltage, it is also no longer possible to operate/regulate the electric machine as a generator. The entire system fails.

SUMMARY OF THE INVENTION

The method according to the present invention provides for power semiconductors of the inverter to be switched in such a way that the driven electric machine induces a voltage and provides it via free-wheeling diodes to the electrical network, the induced voltage being used for operating the electric machine as a generator such that the electric machine sets a specifiable network voltage. Thus, if the electric machine or a rotor of the electric machine is driven, for example in an overrun of the motor vehicle, when the electric machine is driven by drive wheels of the motor vehicle rolling on a roadway, the power semiconductors of the inverter are switched in such a way that a voltage in the electric machine, in particular in the stator windings, is induced and supplied to the electrical network via free-wheeling diodes. The voltage thereby induced and provided depends naturally on the speed of the electric machine or of the rotor of the electric machine.

According to the exemplary embodiments and/or exemplary methods of the present invention, the voltage thus induced in the "idling operating mode" of the electric machine is used for operating the electric machine as a generator such that the latter sets a desired/specifiable network voltage. The induced voltage is advantageously used for operating a voltage regulator, which specifies for the electric machine a (regenerative) torque for generating a network voltage. The advantageous method thus makes it possible to reactivate the electrical network in the simplest manner following a failure of the electrical accumulator, in particular of the high-voltage battery. As soon as the electric machine is able to be operated again as a generator in order to set the network voltage, one or more high-voltage loads may be reactivated as well, the setpoint torque then being specified as a function of the connected high-voltage loads and their power requirement.

Advantageously, at least one load electrically connected to the network, in particular a high-voltage load, is switched off when the malfunction is detected. As a result, the deactivation of loads connected to the network occurs particularly quickly to simultaneously in relation to the disconnection of the electrical accumulator, in particular the high-voltage battery, from the network. This reduces the rate at which the network breaks down.

According to a further development of the exemplary embodiments and/or exemplary methods of the present invention, the electric machine is driven by an internal combustion engine, which is regulated with the aid of a separate engine control unit. If the electric machine and the internal combustion engine advantageously form drive units of a hybrid drive, then these may be mechanically and operatively connected to each other in a simple manner such that the electric machine is drivable by the internal combustion engine when the motor vehicle is at a standstill, and thus a voltage is inducible for restarting the voltage regulation, as described above.

Expediently, the method is performed as a function of the speed of the internal combustion engine and/or of the electric machine. Particularly, a speed range may be specified, within which the method is implemented or may be implemented.

Advantageously, the method is implemented when the speed of the electric machine is above an idling speed of the internal combustion engine. Normally, the electric machine and the internal combustion engine are able to be connected to each other mechanically and operatively such that the speed of the electric machine corresponds to that of the internal combustion engine. The smallest induced voltage possible is thus determined by the idling speed of the internal combustion engine.

Alternatively or additionally, the method is advantageously implemented when the speed of the electric machine is below a specifiable limit speed of the electric machine. Particularly, the limit speed of the electric machine may be specified as a function of a maximum permissible induced voltage. In other words, a limit is specified for the induced voltage. Since the induced voltage depends on the speed of the electric machine, this voltage limit is determined in a simple manner by the limit speed. The limit speed or limit voltage is chosen in such a way that the induced voltage is below a value that would result in damaging components of the electrical network, in particular the inverter. With respect to the inverter, exceeding the limit speed would mean that the overvoltage protection of the inverter would engage anew and thus it would not be possible to regulate the electric machine. The speed range, within which the advantageous method may be implemented, is thus advantageously defined by the idling speed of the internal combustion engine and the limit speed of the electric machine.

According to a further development of the exemplary embodiments and/or exemplary methods of the present invention, the short-circuit operating mode of the inverter is maintained as long as the speed of the electric machine is above the specifiable limit speed. This emergency operating mode of the inverter is thus abandoned only when the speed is within the above-described speed range and damage to network components is precluded.

A particular provision reduces the speed of the internal combustion engine when it is above the limit speed. In other words, an active intervention of the voltage regulating system of the network in the driving operation of the internal combustion engine is provided in order to bring the speed of the internal combustion engine and that of the electric machine mechanically and operatively coupled with it into the permissible speed range, as described above. If the vehicle is in motion, then the speed of the electric machine may also be reduced by actuating brakes of the vehicle if the electric machine is mechanically and operatively connected to drive wheels of the vehicle and not to the internal combustion engine for example.

If the high-voltage battery fails at a certain internal combustion engine idling speed and a certain abrupt change in load occurs, then there is the possibility that the internal combustion engine may stall. An advantageous possibility of preventing this is achieved in an advantageous development of the exemplary embodiments and/or exemplary methods of the present invention, in that the idling speed of the internal combustion engine is increased, particularly advantageously from six hundred to one thousand revolutions per minute and/or in that the electrical drive is provided with a certain setpoint torque, which yields a torque reserve. Increasing the idling speed of the internal combustion engine and/or specifying a certain setpoint torque is advantageously done by the engine control unit via appropriate control signals.

Finally, there is a provision to use a pulse-controlled inverter as inverter.

The exemplary embodiments and/or exemplary methods of the present invention will be explained in greater detail in the following with reference to some figures.

DETAILED DESCRIPTION

Figure 1:
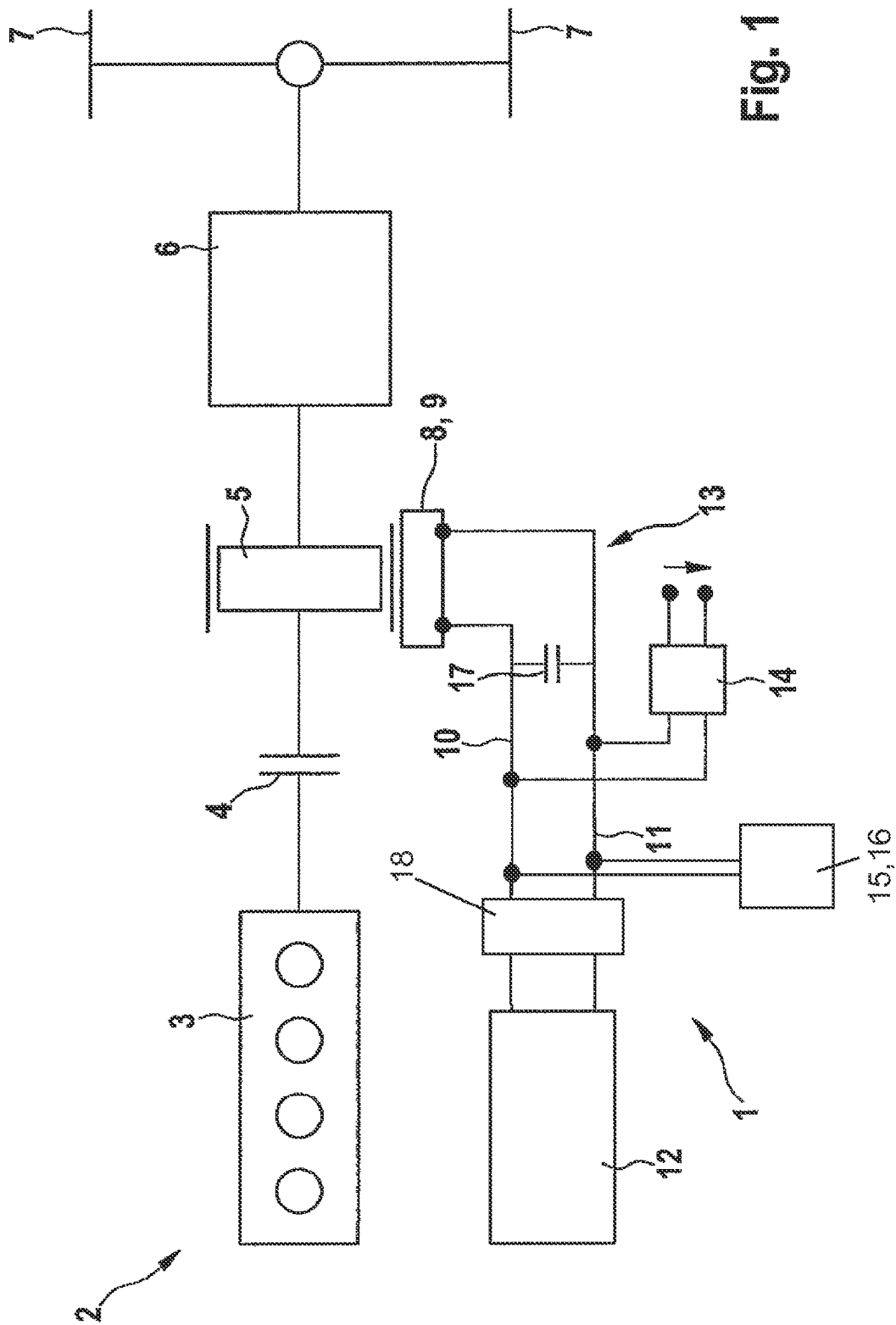
FIG. 1 shows an exemplary embodiment of an electrical network of a hybrid motor vehicle in a schematic representation.

FIG. 1 shows a schematic representation of an exemplary embodiment of an electrical network 1 of a hybrid drive device 2 of a motor vehicle that is not shown here in more detail. Hybrid drive device 2 has an internal combustion engine 3 and an electric machine 5, mechanically and operatively connectible via a clutch 4, as drive units as well as a transmission 6 mechanically and operatively connected to electric machine 5, which transmits the torque generated by the drive units to drive wheels 7 of the motor vehicle. Electric machine 5 is associated with an inverter 8 in the form of a pulse-controlled inverter 9, by which electric machine 5 is controlled or regulated. Via electrical connections 10 and 11, inverter 8 is connected to an electrical accumulator 12, in particular a high-voltage battery. This intermediate circuit 13 of electrical network 1 formed by inverter 8, electrical accumulator 12 and electrical connections 10 and 11, furthermore has a d.c. transformer 14 and at least one high-voltage load 15, for example in the form of an air conditioning compressor 16 connected to it. In normal operation, a voltage regulator, not shown here, ensures that in network 1 an essentially constant network voltage is provided as a function of activated/deactivated loads of network 1.

To protect the components connected to network 1 such as d.c. transformer 14 and air conditioning compressor 16, there is a provision for electrically disconnecting through disconnecting element 18 the electrical accumulator 12 from network 1 or intermediate circuit 13 when detecting a malfunction in electrical network 1, in particular of electrical accumulator 12. If electrical accumulator 12 thus fails, an overvoltage occurs in intermediate circuit 13 and pulse-controlled inverter 9 is switched to an active short circuit such that now electric machine 5 is also no longer able to supply voltage to electrical network 1 or intermediate circuit 13. An intermediate circuit capacitor 17 of intermediate circuit 13 will discharge quickly through d.c. transformer 14 and/or air conditioning compressor 16 if it is activated. The short-circuit operating mode (active short circuit) of pulse controlled inverter 9 or inverter 8 is maintained until all energy has been drained from network 1 or intermediate circuit 13 such that no more voltage is available for operating electric machine 5 and/or high-voltage load 15.

Figure 2:
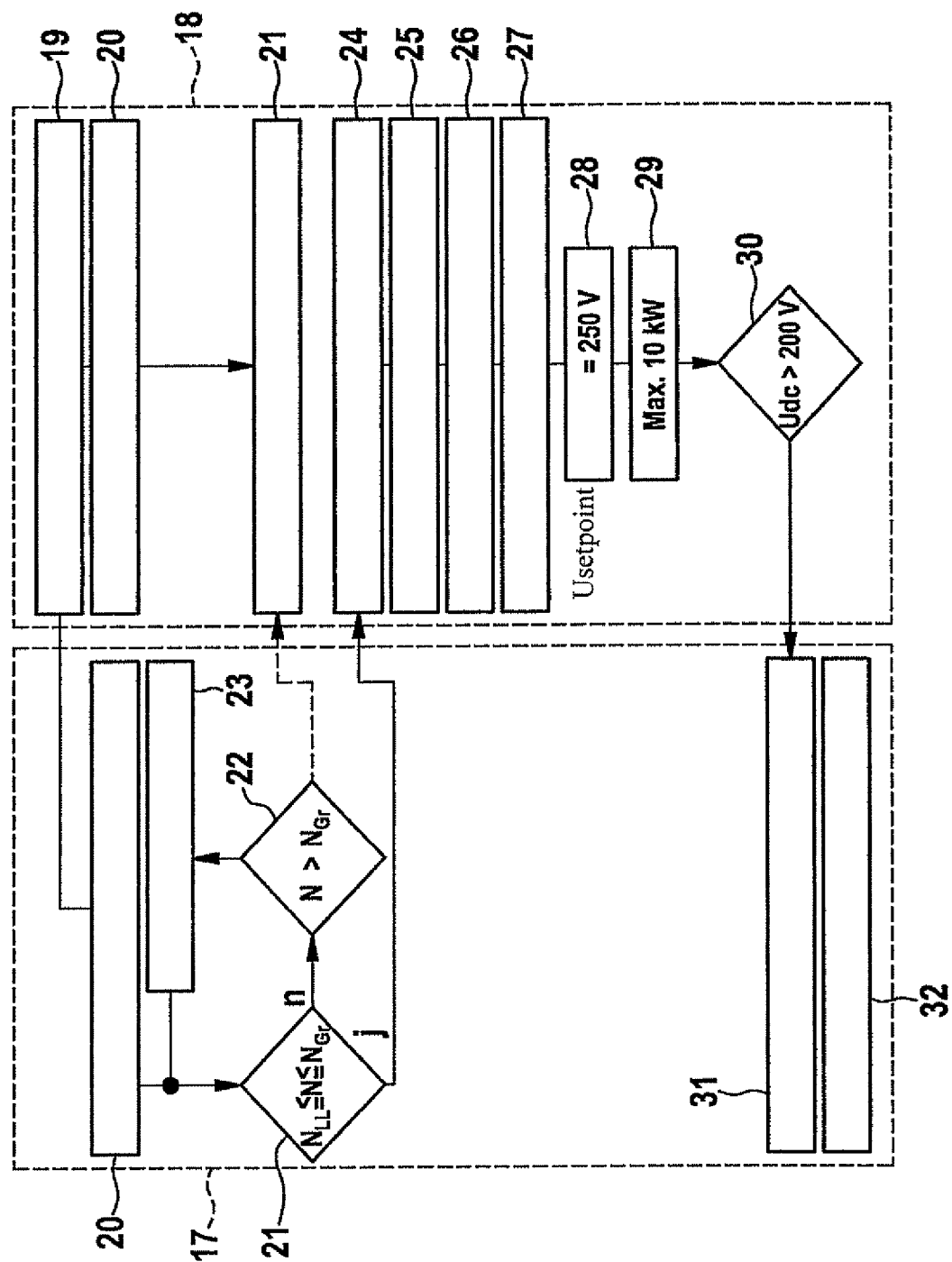
FIG. 2 shows an exemplary embodiment of the advantageous method for operating the electrical network.

With reference to FIG. 2, the advantageous method for operating network 1 will now be explained, which allows for the regulation of the network voltage to be restarted. For this purpose, FIG. 2 shows a flow chart, one region of which—dashed line 17—essentially refers to a control or regulation process of internal combustion engine 3 and the other region of which—dashed line 18—essentially refers to a control or regulation process of pulse-controlled inverter 9. If electrical accumulator 12, in particular a high-voltage battery is electrically disconnected from network 1, as described above, and this is detected in a step 19, then pulse-controlled inverter 9 is first switched into an emergency operating mode 20, which means that the pulse-controlled inverter is switched into short-circuit operating mode 21 or an active short circuit. If electric machine 5 was in the generator operating mode up to this point, this measure prevents an overvoltage from being produced in electrical network 1, which could damage components of network 1, in particular inverter 8. As described above, network 1 or intermediate circuit capacitor 17 is quickly discharged as a result, and the system breaks down. In order to extend the discharge time or to shorten the time until the restart of the regulation, high-voltage loads 15 connected to network 1 such as air conditioning compressor 16 may be switched off or deactivated in a step 20.

For reactivating the system or network, a check is performed in a query 21 as to whether the speed N of the internal combustion engine is in a permissible speed range, the speed range being defined by the idling speed $N_{LL}$ of the internal combustion engine and a specifiable limit speed $N_{Gr}$, which is selected as a function of a voltage induced by electric machine 5 when idling. In the present exemplary embodiment, speed $N_{Gr}$ is the speed at which the induced voltage in intermediate circuit 17 exceeds the limit of 400 V (the maximum continuous voltage allowed in pulse-controlled inverter 9). If query 21 yields the result that speed N is above limit speed $N_{Gr}$, as shown in a step 22, then an intervention is made into the control of internal combustion engine 3 and the speed N of internal combustion engine 3 is reduced until it is below limit speed $N_{Gr}$, as shown in a step 23. If speed N is within the allowed speed range described above, then pulse-controlled inverter 9 may switch from the state "emergency operating mode" (active short circuit) to the "normal operating mode" state (step 24). Since the network voltage of intermediate circuit 17 may be lower than a lower voltage limit, the usually present undervoltage fault detection must be locked or deactivated in a step 25. In a subsequent step 26, the power switches or power semiconductors of inverter 8/pulse-controlled inverter 9 are switched/opened in such a way, that a speed-dependent voltage is built up in intermediate circuit 17. This voltage is supplied to intermediate circuit 17 by the induced rotor voltage from electric machine 5 via free-wheeling diodes. Subsequently, the voltage regulator of intermediate circuit 17 may be reactivated in a step 27. The voltage induced by electric machine 5 in the idling operating mode may thus be used to operate the voltage regulator, which then operates/regulates electric machine 5 as a generator so that electric machine 5 generates a desired network voltage. In this case, the voltage induced in the idling operating mode acts as a starter voltage, so to speak, for starting the voltage regulation of network 1 after the failure of electrical accumulator 12. Advantageously, the voltage regulator regulates the network voltage Usetpoint to 250 V (step 28) and a maximum power of 10 kW (step 29). In a step 30, a check is performed to determine whether the network voltage exceeds a value of Udc=200 V. If this is the case, then in a subsequent step 31, high-voltage loads 15 connected to network 1 such as air conditioning compressor 16 are enabled or activated. From this time onward, exceeding the limit speed $N_{Gr}$ is again permitted (step 32).

All in all, the advantageous method thus makes it possible in a simple manner to reactivate the network voltage following a failure of electrical accumulator 12 and to set it to a specifiable value. In other words, it is possible to restart the voltage regulation of network 1 following a failure of electrical accumulator 12.

Figure 3:
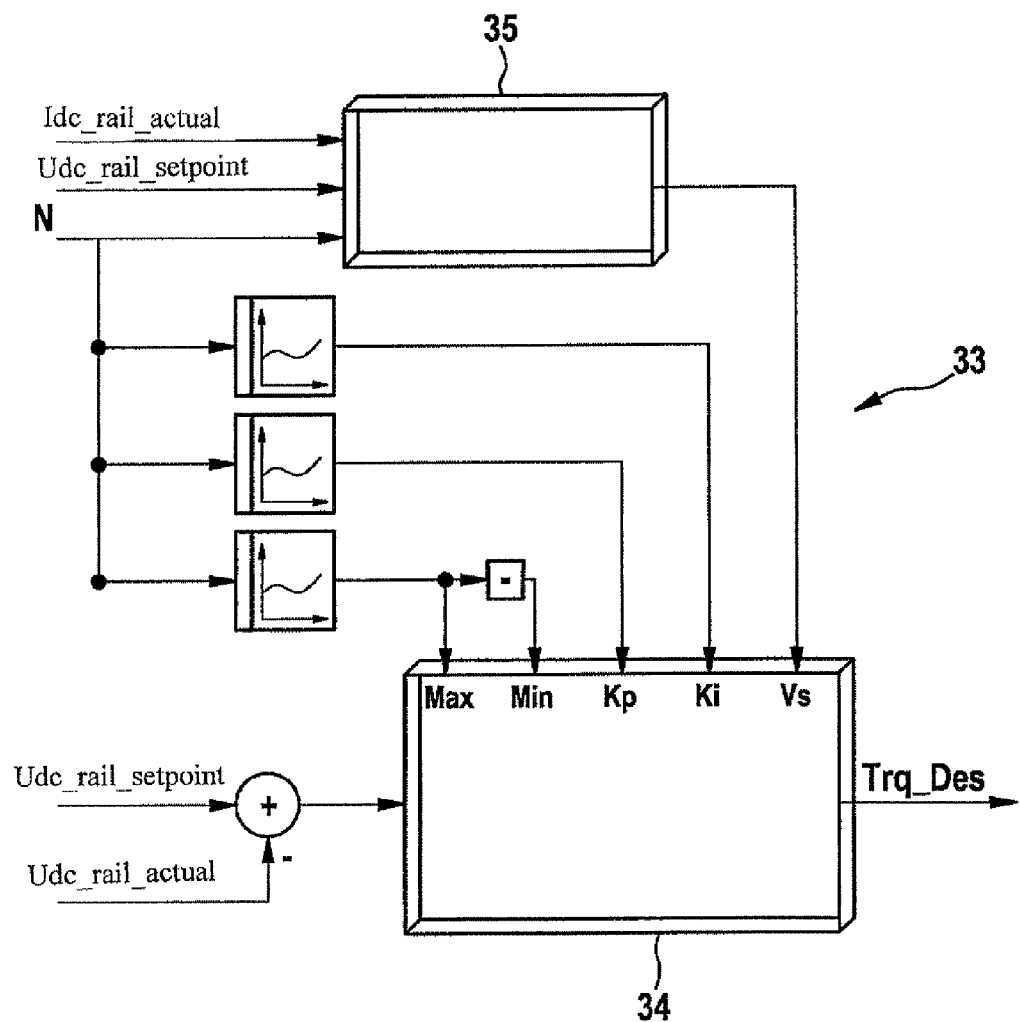
FIG. 3 shows a voltage regulator for regulating the voltage of the network.

FIG. 3 shows a schematic representation of a voltage regulator 33 of electrical network 1 or of intermediate circuit 17 for regulating the voltage of network 1. Voltage regulator 33 has a PI regulator 34, which is supplied with the difference between the setpoint voltage Udc_rail_setpoint and the actual voltage Udc_rail_actual of intermediate circuit 17 as an input variable. On the basis of the differences, PI regulator 34 determines a setpoint torque Trq_Des of electric machine 5 such that the latter generates an appropriate voltage for compensating for the difference. Furthermore, PI regulator 34 is provided with the input variables of a constant Kp, which depends on the speed N of electric machine 5, a constant Ki, which depends on speed N, and the speed range MaxMin described above. Speed N is furthermore supplied to a precontrol 35, which is additionally supplied with the actual current Idc_rail_actual and the setpoint voltage Udc_rail_setpoint of intermediate circuit 17 as input variables. Precontrol 35 supplies a signal Vs to PI regulator 34.

The advantageous method may also be applied in the case in which electrical accumulator 12 is disconnected from network 1 due to a malfunction and electric machine 5 is demanded as a motor to such a degree that intermediate circuit capacitor 17 is completely discharged.

If the high-voltage battery fails at a certain internal combustion engine idling speed and a certain abrupt change in load occurs, then there is the possibility that the internal combustion engine may stall. When switching on a high load, for example when the DC/DC transformer is switched on and off, the engine could stall at a low idling speed. An advantageous possibility of preventing this is achieved in an advantageous development of the exemplary embodiments and/or exemplary methods of the present invention, in that the idling speed of the internal combustion engine is increased, particularly advantageously from six hundred to one thousand revolutions per minute and/or in that the electrical drive is provided with a certain setpoint torque, which yields a torque reserve.

Increasing the idling speed of the internal combustion engine and/or specifying a certain setpoint torque is advantageously done by the engine control unit via appropriate control signals.

What is claimed is:

1. A method for operating an electrical network, the network having at least one electrical accumulator, at least one electric machine, and at least one inverter controlling the electric machine, the method comprising:
    electrically disconnecting the electrical accumulator from the electrical network when a malfunction is detected;
    performing the following steps on the electrical network when the electrical accumulator is electrically disconnected:
    switching the inverter to a short-circuit operating mode when a specifiable voltage limit of a network voltage of the electrical network is subsequently exceeded;
    after switching the inverter, switching power semiconductors of the inverter so that the driven electric machine induces a voltage and provides it via free-wheeling diodes on the electrical network; and
    after switching the power semiconductors of the inverter, using the induced voltage for operating the electric machine as a generator such that a specifiable network voltage is set by the electric machine;
    wherein the electrical network is for a hybrid motor vehicle having the at least one electrical machine and an internal combustion engine.

2. The method of claim 1, wherein at least one load electrically connected to the network is switched off when the malfunction is detected.

3. The method of claim 1, wherein the at least one electric machine is driven by the internal combustion engine.

4. The method of claim 1, wherein the method is implemented as a function of a speed of at least one of the internal combustion engine and the at least one electric machine.

5. The method of claim 1, wherein the method is implemented when a speed of the at least one electric machine is above an idling speed of the internal combustion engine.

6. The method of claim 1, wherein the method is implemented when a speed of the electric machine is below a specifiable limit speed of the electric machine.

7. The method of claim 1, wherein a limit speed is specified as a function of a maximum permissible induced voltage.

8. The method of claim 1, wherein the short-circuit operating mode of the inverter is maintained as long as a speed of the electric machine is above a limit speed.

9. The method of claim 1, wherein a speed of the internal combustion engine is reduced when it is above a limit speed.

10. The method of claim 1, wherein a pulse-controlled inverter is used as the inverter.

11. The method of claim 1, wherein for a failed high voltage battery and at a certain internal combustion engine idling speed and a specifiable abrupt change in load, the idling speed of the internal combustion engine is increased.

12. The method of claim 1, wherein for a failed high voltage battery and at a certain internal combustion engine idling speed and a specifiable abrupt change in load, a certain setpoint torque is specified for the electric drive, which will yield a torque reserve, so as to prevent the internal combustion engine from stalling.

13. The method of claim 1, wherein at least one of increasing an idling speed of the internal combustion engine and specifying a certain setpoint torque is performed by an engine control unit via control signals.

14. The method of claim 1, wherein for a failed high voltage battery and at a certain internal combustion engine idling speed and a specifiable abrupt change in load, the idling speed of the internal combustion engine is increased from six hundred to one thousand revolutions per minute to prevent the internal combustion engine from stalling.

15. The method of claim 1, wherein at least one high voltage load electrically connected to the network is switched off when the malfunction is detected.

16. The method of claim 1, wherein the electrical accumulator is a high-voltage accumulator.

17. The method of claim 7, wherein the limit speed is specified as a function of a limit of a maximum continuous voltage allowed in the inverter.

18. The method of claim 1, wherein the network voltage is regulated to be substantially constant as a function of any loads that are activated or deactivated on the electrical network.

* * * * *